United States Patent [19]

Tanaka et al.

[11] Patent Number: 4,586,388
[45] Date of Patent: May 6, 1986

[54] THREE FORCE BALANCED MECHANISM

[75] Inventors: Mikio Tanaka; Yoshikuni Doki; Yoshihiro Tsuruoka; Masatoshi Fujiwara; Tatsuhide Shiga, all of Kanagawa, Japan

[73] Assignee: Tamura Electric Works, Ltd., Tokyo, Japan

[21] Appl. No.: 549,981

[22] Filed: Nov. 8, 1983

[30] Foreign Application Priority Data

Nov. 12, 1982 [JP] Japan .................. 57-198737

[51] Int. Cl.⁴ .............................. G01L 1/08
[52] U.S. Cl. .................. 73/862.58; 73/701; 73/862.52
[58] Field of Search ............. 73/701, 711, 862.38, 73/862.52, 862.58, 862.61

[56] References Cited

U.S. PATENT DOCUMENTS

| | | | |
|---|---|---|---|
| 2,686,893 | 8/1954 | Markson | 73/701 X |
| 2,993,370 | 7/1961 | Nye, Jr. | 73/701 X |
| 3,084,550 | 4/1963 | Bowditch | 73/701 |
| 3,106,094 | 10/1963 | Gallo | 73/701 |
| 3,175,393 | 3/1965 | Sachers | 73/711 X |
| 3,274,833 | 9/1966 | Ollivier et al. | 73/701 |
| 3,282,110 | 11/1966 | Weir | 73/701 |
| 3,401,561 | 9/1968 | Cook | 73/701 X |
| 3,564,923 | 2/1971 | Nudd, Jr. et al. | 73/701 |
| 3,878,725 | 4/1975 | Gaertner | 73/701 |
| 4,502,333 | 3/1985 | Shiga et al. | 73/701 |

FOREIGN PATENT DOCUMENTS 141656 11/1979 Japan ..................... 73/701

Primary Examiner—Richard L. Chiesa
Attorney, Agent, or Firm—Blakely, Sokoloff, Taylor & Zafman

[57] ABSTRACT

In a three force balanced mechanism comprising a floating pivot, an input force transmitting member, a feedback force transmitting member, one end of the input force transmitting member and one end of the feedback force transmitting member pivot in different directions, a flexible span setting member inclined with respect to the input force transmitting member, one end of the flexible span setting member being wound about or unwound from the floating pivot, there are provided detecting means for detecting the input force, restoring means responsive to the output of the detecting means for applying a restoring force to the feedback force transmitting member, and spring means for varying a force acting upon the input force transmitting member or the feedback force transmitting member in accordance with the movement of the free end of the span setting member. With this improved meter zero point shift can be automatically compensated for thereby eliminating zero point adjustment at the time of varying the measuring range.

10 Claims, 9 Drawing Figures

THREE FORCE BALANCED MECHANISM

BACKGROUND OF THE INVENTION

This invention relates to a three force balanced mechanism utilized in measurements and controls in various fields of industries.

In order to automatically control production steps or the like, it is essential to measure various industrial quantities. For example, by using a three force balanced mechanism utilizing a force balancing system, such process quantities as temperature, pressure, liquid level, and flow can be measured and these measured process quantities are converted into air pressure signals, electric signals, etc. to produce converted signals. These converted signals are measured or transmittted to a pressure meter, a differential pressure meter, a controller meter or type of receivers. We have already proposed an improved three force balanced mechanism in which a floating pivot applied with these forces is provided with a cylindrical surface, one end of a span setting member is wound about the cylindrical surface and the other end of the span setting member is moved along a graduated arcuate groove, whereby the one end of the member is wound about or unwound from the cylindrical surface so as to vary the measuring range. We have filed Japanese patent application No. 170174/1982 entitled three force balanced mechanism and filed on Sept. 29, 1982.

With this improved three force balanced mechanism, the shift of zero point at the time of varying the measuring range still occurs. For example, in a pressure difference meter capable of producing an output P of 0.2 to 1.0 Kgf/cm$^2$ as shown in FIG. 1, where the measuring range of from 0 to 5500 mm H$_2$O set in the output span corresponding to a characteristic shown by a solid line B is varied to a range of from 0 to 500 mm H$_2$O, the characteristics would become as shown by dotted lines b or c starting from zero points shifted upward or downward so that a characteristic having a zero point (0.2 kgf/cm$^2$) as shown by a solid line A can not be obtained.

Consequently, even with a span corresponding to the desired measuring range, the correspondng for zero point outputs for respective ranges become different in that the zero point adjustment is necessary each time the measuring range is varied. Such difficulty also occurs in a prior art meter not improved as that disclosed in the three force balanced mechanism disclosed in the Japanese patent application referred to above.

SUMMARY OF THE INVENTION

It is an object of this invention to provide an improved three force balanced mechanism in which zero point shift can be automatically compensated for, thereby eliminating zero point adjustment at the time of varying the measuring range.

According to this invention, there is provided a three force balanced mechanism of the type comprising a floating pivot, an input force transmitting member, a feedback force transmitting member, one end of the two force transmitting members being connected to the floating pivot in different directions, a flexible span setting member inclined with respect to the input force transmitting member, one end of the flexible span setting member being coupled with the floating pivot, characterized in that there are provided detecting means for detecting the input force, restoring means responsive to the output of the detecting means for applying a restoring force to the feedback force transmitting member, and spring means for varying a force acting upon the input force transmitting member or the feedback force transmitting member in accordance with the movement of the free end of the span setting member.

DESCRIPTION OF THE PREFERRED EMBODIMENTS

Figure 2:
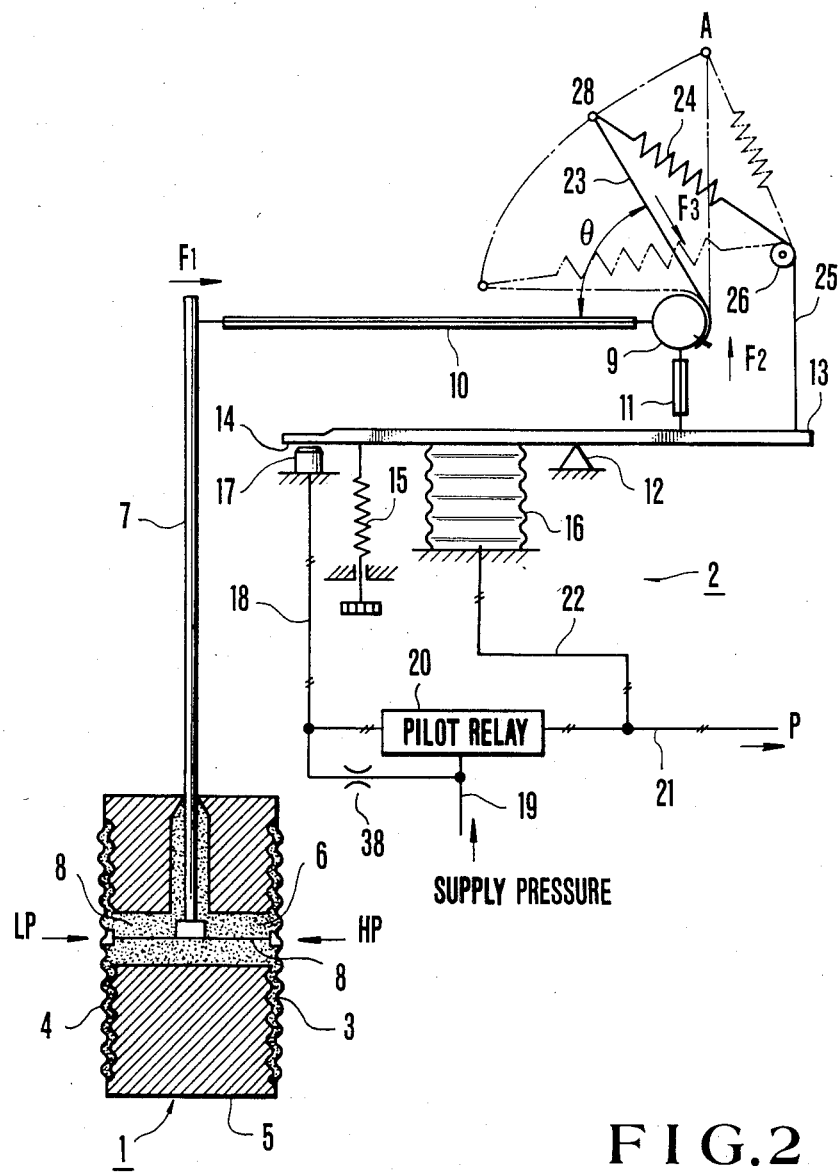
FIG. 2 is a diagrammatic representation showing one embodiment of the three force balanced mechanism according to this invention.

A preferred embodiment of the three force balanced mechanism according to this invention shown in FIG. 2 comprises a detector 1 and a measuring unit 2. In this embodiment, the detector 1 detects a pressure difference and comprises a pressure vessel 5 having pressure receiving diaphragms 3 and 4 on both sides. A seal liquid 6 such as a silicone oil is sealed in the pressure vessel 5 and the lower end of a pressure-derive-out-rod 7 is inserted into the pressure vessel 5. The portion of the pressure-derive-out-rod 7 at which it protrudes to the outside of the pressure vessel 5 is air tight and swingably supported. The inner end of the pressure-derive-out-rod 7 is connected to the inner surfaces of the pressure receiving diaphragms 3 and 4 through a strap 8.

Thus, when a high pressure $H_P$ and a low pressure $L_P$ are applied upon the pressure receiving diaphragms 3 and 4 respectively, these diaphragms displace corresponding to the difference of the high and low pressures so as to displace the sealed liquid 6 from the high pressure side to the low pressure side and the strap 8 causes the pressure-derive-out rod 7 to tilt about the portion at which it projects to the outside of the pressure vessel 5.

The measuring unit 2 comprises a floating pivot 9, an input force transmitting member 10 with one end connected to the outer end of pressure-derive-out rod 7 and the other end connected to the floating pivot 9 and a feedback force transmitting member 11 connected to the floating pivot 9 in a direction different from that of the input force transmitting member 10. The other end of the feedback force transmitting member 11 connected to one end of a feedback beam 13 with its intermediate point tiltably supported by a fulcrum 12. On the other side of the feedback beam 13 are provided a flapper 14, a zero point adjusting spring 15 and a bellows 16. In this embodiment, the zero point adjusting spring 15 is used to set the initial condition of the mechanism or to effect fine adjustment but is not used for changing the range. A nozzle 17 is provided to oppose the flapper 14 with a small gap therebetween, the nozzle 17 and the flapper 14 constituting not only detecting means for detecting the input but also restoring means for restoring the feedback beam 13 in accordance with the output of the detecting means. Supply pressure supplied from tube 19 is applied to the nozzle 17 through a restriction 38 and the tube 18. The back pressure of the nozzle 17 is led to a pilot relay 20. To the pilot relay 20 are connected a conduit 21 which transmits an output pressure corresponding to the variation in the back pressure of the nozzle 17 to the outside and a conduit 22 transmitting the output pressure to the bellows 16.

The floating pivot 9 has a cylindrical surface connected to the input force transmitting member 10 and the feedback force transmitting member 11. The inner end of a flexible span setting wire 23 is secured to the cylindrical surface of the floating pivot 9 and the outer end 28 is fixed to any desired angular direction. When the outer end 28 is moved along an involute curve shown by dot and dash lines shown in FIG. 2, the inner end of the span setting wire 23 is wound about or unwound from the cylindrical surface of the floating pivot 9, thus setting any desired angle $\theta$ with respect to the input force transmitting member 10.

A spring 24 is connected between the outer end of the span setting wire 23 and one end of the feedback beam 13 through a wire 25, an intermediate point thereof being guided by a guide roller 26.

The operation of the three force balanced mechanism having a construction described above will now be described except the operation of the detector 1 because it has already been described.

It is now assumed that the pressure-derive-out-rod 7 applies a rightward force F1 to the input force transmitting member 10. Then F2 and F3 are applied to the feedback force transmitting member 11 and the span setting wire 23 tending to pull the member 11 and the wire 23 toward the floating pivot 9. More particularly, the input force F1 applies the F2 to the feedback beam 13 to tilt it in the counterclockwise direction so as to bring the flapper 14 close to the nozzle 17 thus decreasing the gap therebetween. For this reason, the back pressure of the nozzle 17, that is the detected output, increases, which is amplified by the pilot relay 20 to produce a converted output P which is sent to the outside through conduit 21 and to the bellows 16 via conduit 22 to create a restoring force that restores the feedback beam 13. In other words, the feedback beam 13 is rotated in the clockwise direction to balance with the force F2.

When the outer end 28 of the span setting wire 23 is moved along the involute cure, the inner end of the wire 23 is wound about or unwound from the floating pivot 9, thus making it possible to vary the angle $\theta$ between the wire 23 and the input force transmitting member 10 while maintaining the wire 23 under a tension. At this time, since the effect of the component force F3 upon displacements of various force transmitting members can be neglected, the relationship between the input force F1 and its component force F2 can be given by $F2 = F1 \cdot \tan \theta$ according to trigonometric function. This means that since $\theta$ can be varied greatly according to this invention, a restoring mechanism that can displace only in a limited range can satisfy the requirement of varying the measuring range in which the input force varies greatly.

According to this invention, the spring 24 is provided between the outer end 28 of the span setting wire 23 and one end of the feedback beam 13 so as to compensate for the zero point shift occurring at the time of varying the measuring range. Because the guide roller 26 is located apart from the center of the substatial arcuate movement of the free end 28 of the span setting wire 23 the tension of the spring 24 gradually varies with the change of the measuring range. As a consequence, a predetermined force necessary to prevent zero point shift is applied to the flapper 14 acting as the detecting means through the feedback beam 13. The spring 24 is designed to gradually decrease its tension as the outer end 28 is moved from the maximum range B to the minimum range A. In other words, the spring 24 is designed such that it will enlarge the gap between the nozzle 17 and the flapper 14 by tilting in the clockwise direction the feedback beam 13 about the fulcrum 12 for the purpose of compensating for the tendency as shown by c in FIG. 1.

Figure 1:
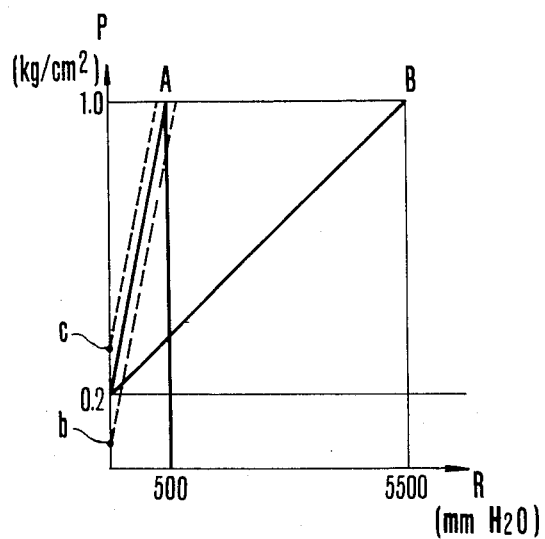
FIG. 1 is a graph showing the relation between the output and the measuring range and useful to explain zero point shift.
Figure 3:
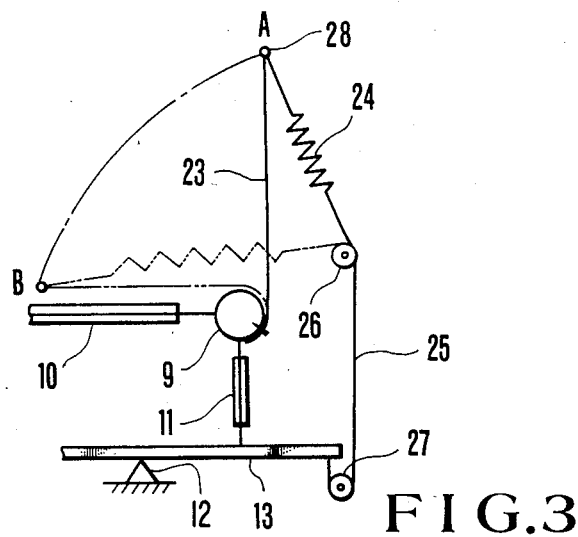
FIG. 3 is a partial diagrammatic view showing another embodiment of this invention.

In a modification shown in FIG. 3, for the purpose of compensating for the tendency as shown by b in FIG. 1, the wire 25 connecting to the spring 24 is passed around a pulley 27 on the lower side of the feedback beam 13 so as to reverse the direction of tension. With this construction, as the outer end 28 approaches the minimum range A, the tension of the spring 24 is decreased to rotate the feedback beam 13 in the counterclockwise direction to close the nozzle 17.

Figure 6:
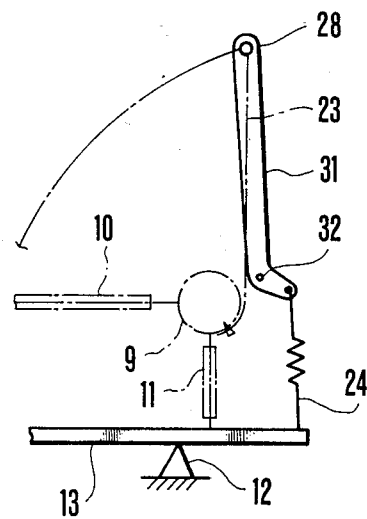
FIGS. 6 through 9 show still other embodiments of this invention.
Figure 7:
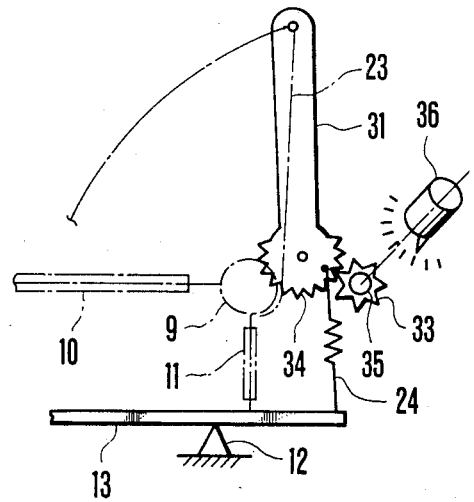

Since according to this invention there is provided spring 24 which automatically adjusts and compensates for the zero point shift by changing its tension in accordance with the movement of the outer end 28 of the span setting wire 23, the spring need not necessarily be connected directly to the span setting wire 23 but may be connected thereto through an arm as shown in FIGS. 6 and 7.

In the other embodiments of this invention shown in FIGS. 6 and 7 elements corresponding to those shown in FIG. 2 are designated by the same reference numerals. In the modification shown in FIG. 6, there is interposed a rotary arm 31 with one end connected to the free end of the span setting wire 23. The rotaty arm 31 rotates about a pivot 32 at the center of a substantially circular arc, that is an involute curve shown by dot and dash lines along which the outer end 28 is moved. The spring 24 for compensating for the zero point shift is connected between the lower end of the rotary arm 31 and one end of the feedback lever 13.

In still another modification shown in FIG. 7, teeth 34 meshing with a pinion 33 are formed on the outer surface of the enlarged rotating central portion of the rotary arm 31, and a knob 36 is secured to the shaft 35 of the pinion 33.

With these modifications too, the movement of the outer end of the span setting wire 23 is transmitted to the spring 24 through the rotary arm 31, thus compensating for the zero point when the output increases with the narrowing of the measuring range. In the modification shown in FIG. 7, by operating the knob 36, the rotary arm 31 is rotated through pinion 33 to vary the measuring range.

Figure 8:
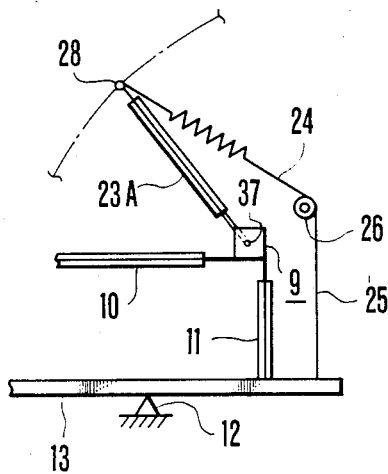

The construction of the span setting wire 23 is not limited to the illustrated construction wherein the direction of the force is changed by winding or unwinding the wire 23. The other construction as shown in FIG. 8 can also be used in which a U-shaped bracket acting as the floating pivot 9 is supported by the input force transmitting member 10 and the feedback force transmitting member 11, both the members being stationary, and the span setting rod member 23A is fixedly secured to a pin 37 journalled by bearings in the bracket, or alternatively, the rod member 23A is slidably applied on a pin 37 fixedly mounted to the bracket 9.

Figure 9:
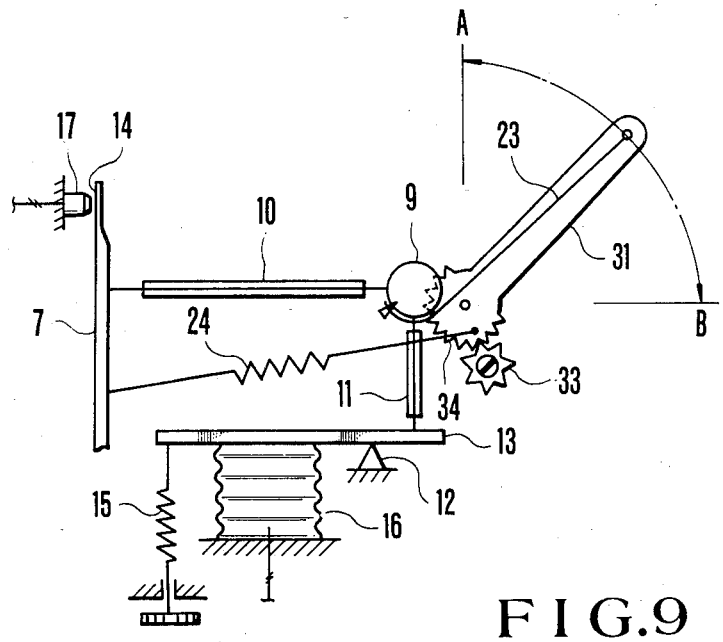

It should be understood that the relative arrangement of the nozzle 17 and the flapper 14 may be altered as desired. Thus, in a still another modification shown in FIG. 9, the flapper 14 is secured to the upper end of the pressure-derive-out-rod 7 and the nozzle 17 is disposed to oppose the flapper. In this modification, spring 24 is provided between the base portion of the rotary arm 35 and the pressure-derive-out-rod 7 so that as the rotary arm 31 rotates the force applied to the flapper 14 is increased or decreased. As the means for slidably fixing the end of the spring 24, screws can also be used.

Although in the foregoing embodiments a pneumatic detector including a nozzle and a flapper was used, other types of detectors can also be used including an electric detector in which inductance variation is used, or a photoelectric detector which detects light input. Furthermore electromagnetic force can be used for restoring the feedback beam.

As above described the input force transmitting member and the feedback force transmitting member are connected to a floating pivot and a span setting wire is secured to the floating pivot such that its direction of operation can be varied. There is also provided a spring which varies the force applied to the detecting means in accordance with the movement of the outer end of the span settig wire. Accordingly, the spring can automatically compensate for the zero point shift in accordance with the adjustment of the third span setting wire effected for varying the measuring range. This can eliminate a zero point adjusting operation, thereby improving the operating characteristic of the meter.

Further, since the invention can be carried out by merely attaching a spring to the conventional meter, no extensive design change is necessary.

The second embodiment of this invention will now be described which is characterized to improve the accuracy of compensation effected by spring 24 of each range by varying the initial tension thereof.

Figure 4:
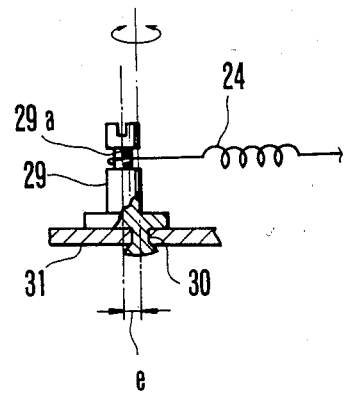
FIG. 4 is a partial sectional view of a spring end of still another embodiment of this invention.

Thus, as shown in FIG. 4, one end of spring 24 is formed as a hook to engage a small diameter portion 29a of an anchor rod 29 which is provided with a projection 30 at an eccentric position. The projection 30 extends through one end of the rotary arm 31 as shown FIGS. 6, 7 and 9, and the lower end of the anchor rod 29 is calked to rotate freely. Accordingly, the anchor rod 29 can be rotated about the projection with a screw driver or the like so as to adjust the tension of the spring 24 up to twice of the eccentricity e.

Figure 5:
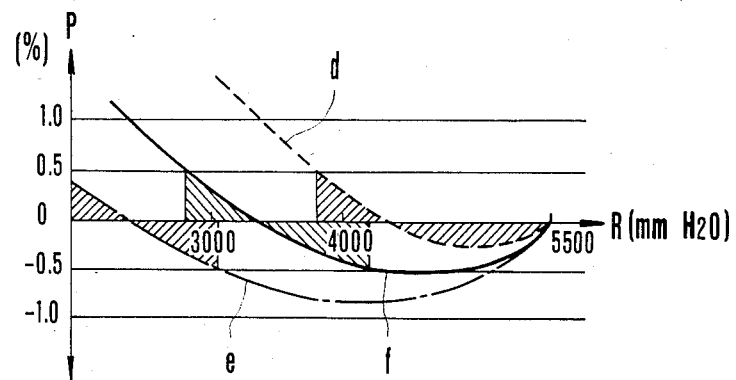
FIG. 5 is a graph showing the relation between the zero point and the measuring range useful to explain the operation of a modified three force balanced mechanism according to this invention.

FIG. 5 is a graph showing the relationship between the measuring range R and zero point (output P with respect to a zero input). From FIG. 5 it can be noted that graphs having various characteristics can be depicted by varying the initial tension of the spring 24. Since these graphs crossed the zero point at different heights (output P), if it is desired to obtain high accuracies of ±0.5%, for example, the spring pressure is selected to obtain a characteristic d, to measure a range or 4000-5500 mmH$_2$O, a characteristic f for a range of 3000-4000 mmH$_2$O and a characteristic e for a range of less than 3000 mmH$_2$O.

By adjusting the tension of the spring 24 as above described, it is possible to adjust at high accuracies for respective measuring ranges as shown in FIG. 5. Alternatively, the tension of the spring can be finely adjusted by converting one end of the spring 24 to an adjusting member, not shown, contrasted to being finely adjustable in its position so as to compensate for the zero point at high accuracies.

It should be understood that the invention is not limited in its application to the detail of construction and arrangement of parts illustrated in the accompanying drawings. For example, the pilot relay shown in FIG. 2 may be arranged on the conduit 21.

What is claimed is:

1. An improved three force balanced mechanism for automatically adjusting and compensating for zero point shifting occuring at a change in measuring range that comprises:
    a floating pivot;
    an input force transmitting member;
    a feedback force transmitting member, one end of said input force transmitting member and one end of said feedback force transmitting member being connected to said floating pivot in different directions;
    a span setting member inclined with respect to said input force transmitting member, one end of said span setting member being coupled to said floating pivot;
    detecting means for detecting an input force;
    restoring means, responsive to an output of said detecting means, for applying a restoring force to said feedback force transmitting member; and
    spring means for applying a varying force upon said input force transmitting member and said feedback force transmitting member in accordance with movement of the other end of said span setting member, thereby automatically adjusting and compensating for said zero point shift.

2. A three force balanced mechanism according to claim 1 wherein said span setting member is made of flexible material, and wherein said floating pivot has a cylindrical surface and said span setting member is wound about or unwound from said cylindrical surface so as to vary the acting direction of said span setting member acting on said floating pivot.

3. A three force balanced mechanism according to claim 1 wherein said span setting member comprises a span setting rod.

4. A three force balanced mechanism according to claim 1 which further comprises means for adjusting tension of said spring means.

5. A three force balanced mechanism according to claim 1 which further comprises a rotary arm, with its one end supporting a free end of said span setting member and said spring is connected between the other end of said rotary arm and said feedback force transmitting member.

6. A three force balanced mechanism according to claim 5 wherein a base portion of said rotary arm is enlarged and formed with teeth, and a knob is provided to rotate said rotary arm through said teeth and a pinion.

7. A three force balanced mechanism according to claim 6 which further comprises an anchor rod having a projection at an eccentric position on the rear side, said projection rotatably mounted on the rotary arm.

8. A three force balanced mechanism according to claim 7 wherein said input force transmitting member is connected to a pressure-derive-out-rod of a measuring device, a flapper is connected to an end of said input force transmitting member to face a nozzle, and said spring means is connected between said pressure-derive-out-rod and the enlarged portion of the rotary arm.

9. A three force balanced mechanism according to claim 1 which further comprises means for reversing the direction of force of said spring means acting upon said feedback force transmitting member.

10. A three force balanced mechanism according to claim 1 wherein said floating pivot comprises an annular ring which is connected to said input force transmitting member, said feedback force transmitting member and said span setting member.

* * * * *

UNITED STATES PATENT AND TRADEMARK OFFICE
CERTIFICATE OF CORRECTION

PATENT NO. : 4,586,388

DATED : May 6, 1986

INVENTOR(S) : Tanaka et al.

It is certified that error appears in the above-identified patent and that said Letters Patent is hereby corrected as shown below:

| COLUMN | LINE | |
|---|---|---|
| [73] | | Please delete Assignee "Tamura Electric Works, Ltd., Tokyo, Japan" and insert --Yamatake-Honeywell Co., Ltd., Tokyo, Japan--. |

Signed and Sealed this

Twenty-sixth Day of August 1986

[SEAL]

Attest:

DONALD J. QUIGG

Attesting Officer

Commissioner of Patents and Trademarks